United States Patent [19]

Bergmann et al.

[11] Patent Number: 6,002,512

[45] Date of Patent: Dec. 14, 1999

[54] OPTICAL CIRCULATOR USING LATCHABLE GARNET

[75] Inventors: Ernest Eisenhardt Bergmann, Fountain Hill, Pa.; Neal Henry Thorsten, Lebanon, N.J.

[73] Assignee: Lucent Technologies, Inc., Murray Hill, N.J.

[21] Appl. No.: 09/175,502

[22] Filed: Oct. 20, 1998

[51] Int. Cl.$^6$ .................................................. G02F 1/09
[52] U.S. Cl. .................. 359/281; 359/282; 359/484; 359/494; 359/256; 372/703
[58] Field of Search ............................ 359/280, 281, 359/282, 484, 494, 495, 256, 497; 372/703

[56] References Cited

U.S. PATENT DOCUMENTS

| | | |
|---|---|---|
| 5,204,771 | 4/1993 | Koga . |
| 5,345,329 | 9/1994 | Shirai et al. ............................. 359/282 |
| 5,381,261 | 1/1995 | Hirai et al. ............................. 359/282 |
| 5,446,578 | 8/1995 | Cheng et al. ........................... 359/282 |
| 5,471,340 | 11/1995 | Cheng et al. ........................... 359/281 |
| 5,608,570 | 3/1997 | Brandle, Jr. et al. . |
| 5,768,015 | 6/1998 | Pattie ..................................... 359/484 |
| 5,774,264 | 6/1998 | Konno et al. .......................... 359/282 |

FOREIGN PATENT DOCUMENTS 7-5393 1/1995 Japan .

*Primary Examiner*—Loha Ben

[57] ABSTRACT

An optical circulator is disclosed that utilizes a polarization rotator comprising a polarization changer (e.g., a properly-oriented half-wave plate) in combination with a pair of latched garnet Faraday rotators. The latched garnet rotators are positioned next to each other and oriented so that one latched garnet rotator provides clockwise rotation and the other provides counterclockwise rotation. The use of latched garnet with a single half wave plate results in an arrangement that is reduced in overall size and does not require epoxy to interconnection the various piece parts.

5 Claims, 3 Drawing Sheets

OPTICAL CIRCULATOR USING LATCHABLE GARNET

BACKGROUND OF THE INVENTION

The present invention relates to optical circulators and, more particularly, to circulators using latchable garnet components as Faraday rotators.

DESCRIPTION OF THE PRIOR ART

In the heart of all practical fiber optic non-reciprocal devices (e.g., isolators and circulators) there is at least one Faraday rotation region. Particularly in many circulator designs, Faraday rotation regions are immediately preceded or followed by "reciprocal" polarization changers, often half-wave plates. In polarization-independent optical circulators using walk-off plates to separate the polarizations, there is a need to form a "cluster" of these components. One exemplary arrangement using such a "cluster" is disclosed in U.S. Pat. No. 5,204,771 issued to M. Koga on Apr. 20, 1993. As disclosed by Koga, an exemplary rotator comprises a "cluster" consisting of a pair of reciprocal rotators (half wave plates) disposed adjacent to one another and oriented such that one provides a clockwise rotation and the other provides a counterclockwise rotation, followed by a conventional single sheet of Faraday rotator material, the Faraday rotator material surrounded by a permanent magnet.

One problem with such a design is the necessity to maintain the external magnetic field to provide the requisite Faraday effect. Additionally, the orientation of the pair of reciprocal rotators needs to be carefully controlled to ensure that each provides the necessary rotation in the same plane.

SUMMARY OF THE INVENTION

The need remaining in the prior art is addressed by the present invention, which relates to optical circulators and, more particularly, to circulators using latchable garnet components as Faraday rotators.

In accordance with the present invention, an exemplary optical circulator utilizes a "cluster" consisting of a single half-wave plate followed by a pair of latchable garnet Faraday rotators. Latchable garnet exhibits the required non-reciprocal 45° rotation without the need to apply an external magnetic field. A pair of such latchable garnets are disposed side-by-side so that a first latchable garnet provides a clockwise rotation and a second garnet provides a counterclockwise rotation. This combination provides the same isolation capabilities as various prior art designs.

An advantage of the arrangement of the present invention is that latchable garnet has no "axis" (only designations of "front" and "back"). Therefore, there is no orientation/alignment problems as there is in prior art arrangements using pairs of half wave plates.

Another advantage of the present invention is the reduction in the number of components required to form a circulator, particularly the removal of the permanent magnet from the arrangement.

Other and further advantages of the present invention will become apparent during the course of the following discussion and by reference to the accompanying drawing.

BRIEF DESCRIPTION OF THE DRAWING

Referring now to the drawings,

FIG. 1 illustrates a forward-propagating signal passing from a first port to a second port, FIG. 2 illustrates a reverse-propagating signal passing from the second port to a third port, and FIG. 3 illustrates a forward-propagating signal passing from the third port to a fourth port.

DETAILED DESCRIPTION

Figure 1:
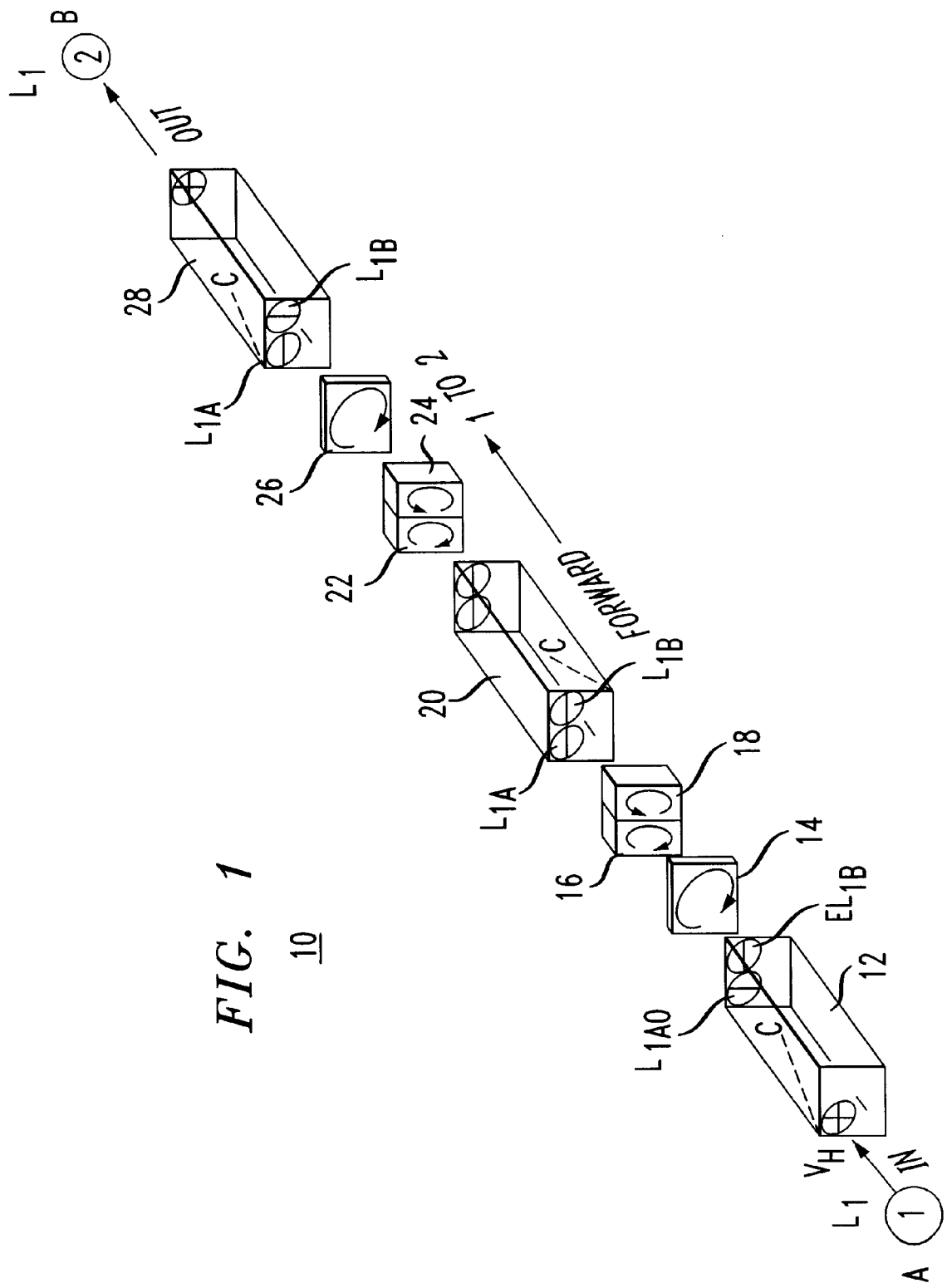
FIGS. 1–3 illustrate an exemplary optical circulator utilizing pairs of latchable garnet as Faraday rotations, where
Figure 2:
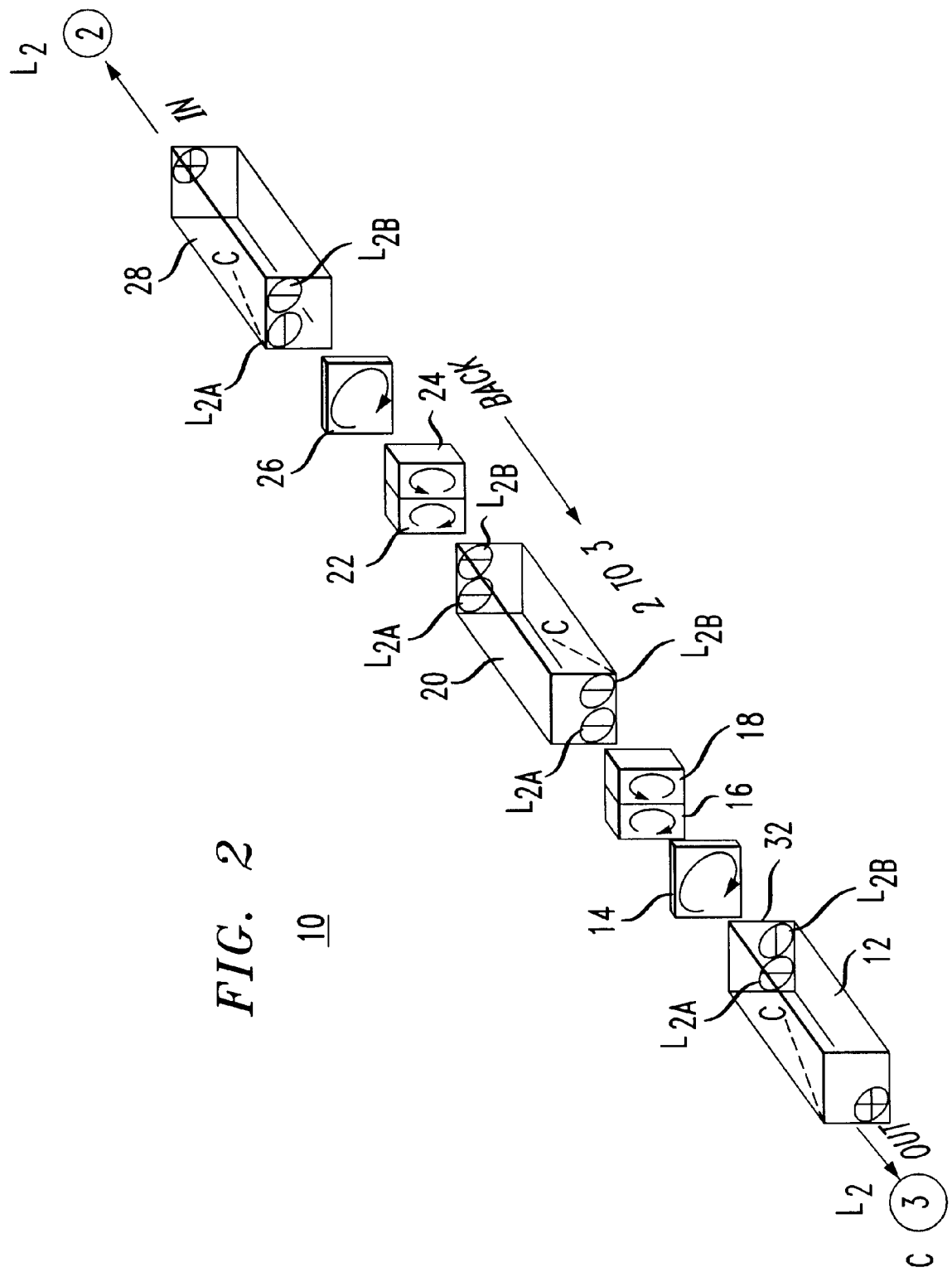
Figure 3:
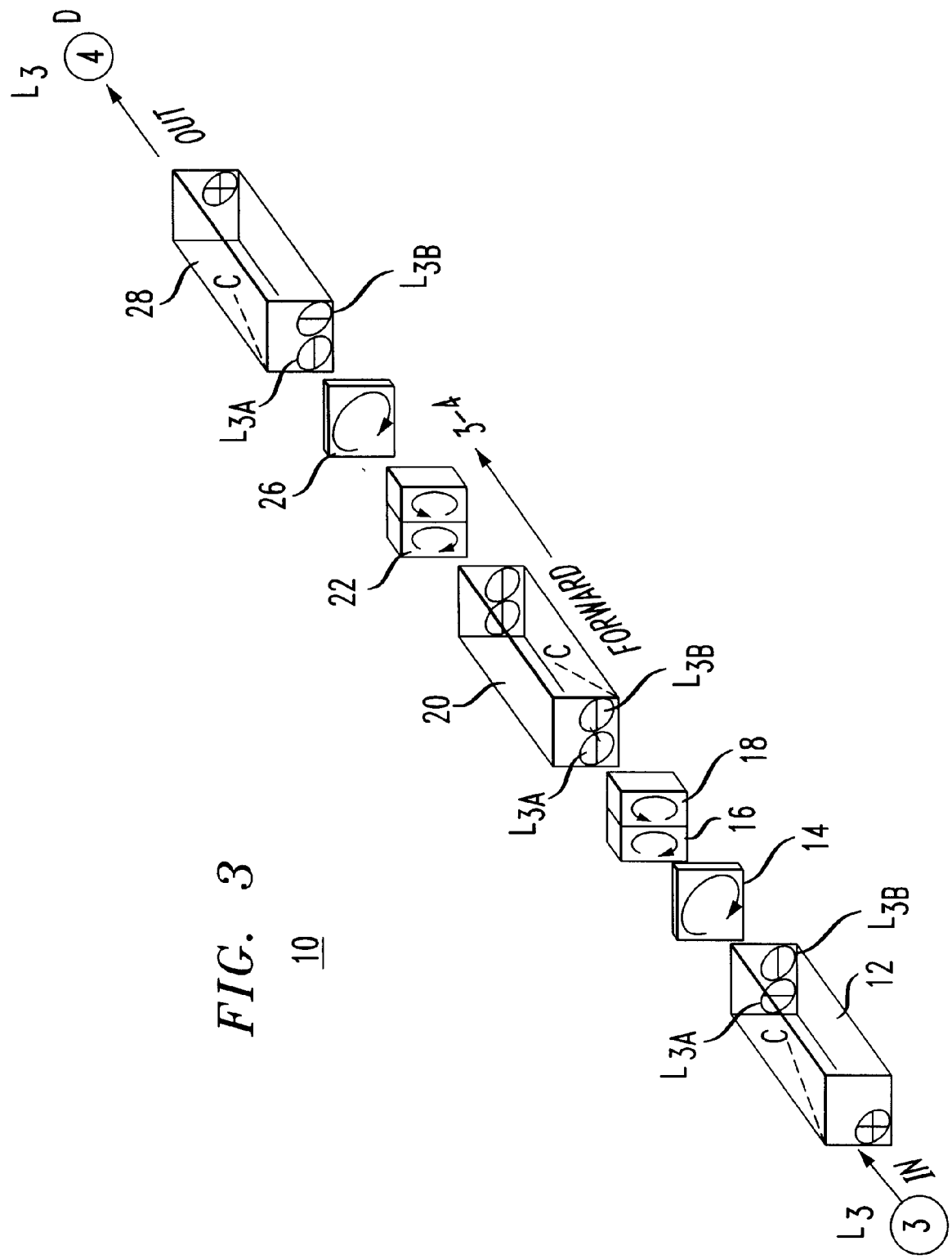

An exemplary optical circulator 10 utilizing pairs of latchable garnet is illustrated in FIG. 1. Optical circulator 10 comprises four separate ports, labeled "A", "B", "C", and "D". As illustrated in FIG. 1, an optical signal may be coupled into port A (via an optical fiber or waveguide that is coupled, via a collimating means such as a GRIN lens or molded aspheric lens, to circulator 10), propagate in the forward direction through circulator 10 and, as will be described in detail below, exit port B. FIG. 2 illustrates the same circulator 10, with an optical signal illustrated as entering port B and thereafter propagating in the reverse direction through circulator 10 so as to exit at port C. A signal introduced into port C, as shown in FIG. 3, will propagate through circulator 10 in the forward direction and exit at port D.

Referring back to FIG. 1, an optical signal $L_1$ is coupled into port A of circulator 10, in particular, into a first walk-off device 12 of circulator 10. As shown, signal $L_1$ comprises polarization components along both the "O" (ordinary) and "E" (extraordinary) optical polarization directions. As is well-known in the art, "ordinary"/"O"-polarized light propagates through a birefringent device (such as walk-off device 12) as if the medium is not birefringent, but is effectively isotropic with an index of refraction defined as no, where the value of no is dependent upon the crystalline medium and wavelength, but not on the direction of propagation. In contrast, the "extraordinary"/"E" light propagates in an "extraordinary" way; that is, deflecting sideways in a manner not easily described by Snell's Law. Walk-off device 12, which may comprise a rutile element, functions to separate these orthogonal components, as shown, so that the O and E components of signal $L_1$ exit rutile 12 along separate paths. The separated O and E components (referred to, respectively, as $L_{1A}$ and $L_{1B}$) next pass through a polarization changer 14, such as a suitably-oriented half-wave plate or an optically active material, where polarization changer 14 functions to transform both principle polarization components $L_{1A}$ and $L_{1B}$ 45° in the clockwise direction. In accordance with the present invention, a pair of latchable garnet Faraday rotators 16, 18 are next used to provide non-reciprocal rotation to each of the $L_{1A}$ and $L_{1B}$ components. The use of latchable garnet in an isolator is disclosed in U.S. Pat. No. 5,608,570, where it explains that a particular composition of garnet may be initially saturated to constitute an essentially single magnetic domain. Thereafter, the domain will remain essentially constant and does not require the constant application of a magnetic field to maintain the non-reciprocal property of the material. Referring back to FIG. 1, a first section of latchable garnet 16 is oriented along the optical axis of circulator 10 so as to provide a clockwise rotation to the $L_{1A}$ component of input optical signal $L_1$. The second section of latchable garnet 18 is disposed adjacent to first section 16, but is turned in the opposite direction, so as to provide for a counterclockwise rotation to the signal component passing therethrough. In the arrangement of FIG. 1, the $L_{1B}$ component of input optical signal $L_1$ will pass through second garnet section 18. Upon exiting latchable garnet pair 16,18, therefore, the $L_{1A}$ and $L_{1B}$ component polarizations will be parallel (since the $L_{1A}$ component has been rotated 45° twice in the clockwise direction, and the $L_{1B}$ component has been rotated 45° once in he clockwise direction, then rotated 45° once in the counterclockwise direction).

These parallel $L_{1A}$ and $L_{1B}$ components next propagate in parallel paths through a second walk-off device 20, with its optical axis oriented as shown in FIG. 1. With this particular orientation, parallel components $L_{1A}$ and $L_{1B}$ are both O-polarized with respect to device 20 and therefore propagate as expected by a simple application of Snell's Law, emerging from device 20 in their same positions, as shown. Thereafter, components $L_{1A}$ and $L_{1B}$ propagate through a second pair of latchable garnet rotators 22,24. In this pair of non-reciprocal rotators, first rotator 22 will perform a counterclockwise 45° rotation upon the $L_{1A}$ component of the signal and second rotator 24 will perform a clockwise 45° rotation upon the $L_{1B}$ component of signal $L_1$. The rotated $L_{1A}$ and $L_{1B}$ components next pass through a second polarization changer (e.g., half-wave plate) 26, which imparts an additional 45° clockwise polarization rotation upon each component. Thus, the $L_{1A}$ and $L_{1B}$ components will again be orthogonal to one another as they exit plate 26, as shown in FIG. 1. These orthogonal components next pass through a third walk-off device 28 (with its optical axis as shown in FIG. 1), where device 28 functions to re-combine these components such that optical signal $L_1$ will exit circulator 10 at port B, as shown.

In operation as a circulator, an optical signal that is coupled into port B will propagate in the reverse direction through circulator 10, as mentioned above, and exit through port C, where port C is disposed below port A, as shown. Referring to FIG. 2, input signal $L_2$ is coupled as an input signal into port B at third walk-off device 28. Input signal $L_2$ propagates through walk-off device 28 in the direction shown, where walk-off device 28 (for example, a rutile component) functions to split input signal $L_2$ into its orthogonal O and E components (denoted $L_{2A}$ and $L_{2B}$ in FIG. 2). Thereafter, the separate $L_{2A}$ and $L_{2B}$ components of signal $L_2$ will pass through second polarization changer 26. As is well-known in the art, signals propagating through such a device in the reverse direction will experience a rotation opposite (when viewed from the same position) that of a signal passing through in the forward direction. In particular, referring back to FIG. 1, a signal passing from left to right through device 26 experienced a 45° clockwise rotation. When used as shown in a FIG. 2, the $L_{2A}$ and $L_{2B}$ components of signal $L_2$ in the right to left direction will experience a 45° counterclockwise rotation (when viewed from the left side of the arrangement, as illustrated in FIG. 2). Subsequent to this counterclockwise rotation, the $L_{2A}$ and $L_{2B}$ components of signal $L_2$ will propagate through latched garnet rotators 22,24. Since latched garnet produces a non-reciprocal rotation (that is, the rotation is independent of the signal's propagation direction), the $L_{2A}$ component will experience a 45° counterclockwise rotation and the $L_{2B}$ component will experience a 45° clockwise rotation. As a result of these differences in rotation direction, the $L_{2A}$ and $L_{2B}$ components will now be parallel, as shown along face 30 of second walkoff device 20.

These parallel $L_{2A}$ and $L_{2B}$ components, which are both E-polarized components with respect to device 20, will next propagate through second walk-off device 20, moving along the length of device 20 so as to exit (remaining as separate parallel polarized components) in the bottom region of device 20. The parallel $L_{2A}$ and $L_{2B}$ components next pass through latched garnet devices 16, 18; latched garnet 16 providing a 45° clockwise rotation to the $L_{2A}$ component and latched garnet 18 providing a 45° counterclockwise rotation to the $L_{2B}$ component. The rotated components then pass through first polarization changer 14 (which in this direction provides a 45° counterclockwise rotation). This last rotation thus returns the $L_{2A}$ and $L_{2B}$ components to their orthogonal orientation, as shown at face 32 of first walk-off device 12. These separate polarizations will then be combined as the signals pass through first walk-off device 12, exiting circulator 10 at port C, as shown.

Referring to both FIGS. 1 and 2, it has now been shown that an optical signal entering port A will propagate through circulator 10 so as to exit at port B, and an optical signal entering port B will propagate through circulator 10 (in the reverse direction) to exit circulator 10 at port C. Lastly, FIG. 3 will illustrate the propagation of a third optical signal, $L_3$, applied as an input to port C. As shown, input signal $L_3$ will be split, by first walk-off device 12, into its orthogonally polarized $L_{3A}$ and $L_{3B}$ components. As these components pass through the combination of first polarization changer 14 and latched garnet sections 16, 18 (the $L_{3A}$ component passing through garnet 16 and the $L_{3B}$ component passing through garnet 18), the components will be parallel, as shown at face 52 of second walk-off device 20.

As a result of the optical orientation of second walk-off device 20, parallel polarized components $L_{3A}$ and $L_{3B}$ are O-polarized with respect to device 20 will pass through as expected by Snell's Law, exiting as shown along face 30 of device 20. Thereafter, the parallel polarized $L_{3A}$ and $L_{3B}$ components of signal $L_3$ will propagate through latched garnet rotators 22,24 and second polarization changer 26, resulting in re-orienting the polarizations in an orthogonal relationship, as shown at face 36 of third walk-off device 28. These orthogonal $L_{3A}$ and $L_{3B}$ components will be re-combined as they propagate through device 28 and exit device 28 at port D. Although not shown in any of the drawings, a signal applied as an input to port D would be deflected further down when traversing through device 20 and either be lost or coupled into a lower port (not shown).

It is to be understood that although quartz was mentioned as a preferred material for the polarization changers, various other suitable changers/rotators may be used.

What is claimed is:

1. A polarization changer comprising:
   a reciprocal changer for transforming an optical signal passing therethrough a predetermined amount, the rotation being clockwise in a first propagation direction and counterclockwise in a second, opposite propagation direction;
   a first latched garnet non-reciprocal rotator including first and second opposing faces for clockwise rotating an optical signal passing therethrough by a predetermined amount; and
   a second latched garnet non-reciprocal rotator including first and second opposing faces for counterclockwise rotating an optical signal passing therethrough by the predetermined amount associated with the first latched garnet non-reciprocal rotator, the second latched garnet non-reciprocal rotator disposed adjacent to said first rotator such that the first face of said first latched garnet rotator is aligned with the first face of said second latched garnet rotator, said reciprocal changer disposed adjacent to the aligned first faces of said first and second latched garnet non-reciprocal rotators.

2. An optical polarization changer as defined in claim 1 wherein each predetermined effective rotation for the principal polarization directions is 45°.

3. An optical circulator comprising a pair of optical polarization changers, each polarization changer comprising:
- a reciprocal changer for transforming an optical signal passing therethrough a predetermined amount, the rotation being clockwise in a first propagation direction and counterclockwise in a second, opposite propagation direction;
- a first latched garnet non-reciprocal rotator including first and second opposing faces for clockwise rotating an optical signal passing therethrough by a predetermined amount; and
- a second latched garnet non-reciprocal rotator including first and second opposing faces for counterclockwise rotating an optical signal passing therethrough by the predetermined amount associated with the first latched garnet non-reciprocal rotator, the second latched garnet non-reciprocal rotator disposed adjacent to said first rotator such that the first face of said first latched garnet rotator is aligned with the first face of said second latched garnet rotator, said reciprocal changer disposed adjacent to the aligned first faces of said first and second latched garnet non-reciprocal rotators, said circulator further comprising:
  - a first walk-off device disposed at the input of the circulator, said first walk-off device for separating, in a first direction, an input signal into orthogonal polarization components and for combining, in a second, opposite direction, a pair of orthogonal signal components into an output signal, a first optical polarization changer being disposed adjacent to said first walk-off device;
  - a second walk-off device, said second walk-off device disposed between the first polarization changer and a second polarization changer of the pair of polarization changers, said second walk-off device not affecting signals passing through in the first direction and transposing locations of said signals passing through in the second direction; and
  - a third walk-off device, said third walk-off device disposed between the second polarization changer and the circulator output, said third walk-off device for combining, in the first direction, orthogonal polarization components into an output signal and for separating, in the second direction, an input signal into a pair of orthogonal signal components.

4. An optical circulator comprising:
- a first walk-off device disposed at the input of the circulator, said first walk-off device for separating, in a first direction, an input signal into orthogonal polarization components and for combining, in a second, opposite direction, a pair of orthogonal signal components into an output signal;
- a first polarization changer disposed at the output of said first walk-off device for rotating, in a first direction, the polarization of the pair of orthogonal signal components by a predetermined amount;
- a first latched garnet non-reciprocal rotator disposed at the output of said first polarization changer intercept one component of said pair of orthogonal signal components;
- a second latched garnet non-reciprocal rotator disposed at the output of said first polarization changer to intercept the remaining component of said pair of orthogonal signal components, said first and second latched garnet rotators oriented to provide opposite directions of rotation to the signals passing therethrough so that the pair of optical components exit as parallel signal components, each latched garnet rotator rotating the signals by essentially the same predetermined amount;
- a second walk-off device disposed at the output of the first and second latched garnet non-reciprocal rotators and oriented such that said signal components pass through unaffected;
- a third latched garnet non-reciprocal rotator disposed at the output of said second walk-off device to intercept one component of said pair of parallel signal components;
- a fourth latched garnet non-reciprocal rotator disposed at the output of said second walk-off device to intercept the remaining component of said pair of parallel signal components;
- a second polarization changer disposed at the output of said third and fourth latched garnet non-reciprocal rotators, said second polarization changer for rotating, in a second, opposite direction, the pair of parallel signal components by a predetermined amount, thereby providing as an output a pair of orthogonal signal components; and
- a third walk-off device for receiving the pair of orthogonal signal components and re-combining said components to provide a circulator output signal.

5. An optical circulator as defined in claim 4 wherein
the first polarization changer provides a 45° clockwise polarization rotation;
the first, second, third and fourth latched garnet non-reciprocal rotators each provide a 45° rotation; and
the second polarization changer provides a 45° counterclockwise polarization rotation.

* * * * *